United States Patent
Kamata

(10) Patent No.: US 6,333,805 B1
(45) Date of Patent: Dec. 25, 2001

(54) OPTICAL OUTPUT CONTROL CIRCUIT

(75) Inventor: Hisashi Kamata, Miyagi (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/576,182

(22) Filed: May 23, 2000

(30) Foreign Application Priority Data

May 25, 1999 (JP) .................................................. 11-144555

(51) Int. Cl.[7] .......................... G02B 26/00; H04B 10/04; G01J 1/32; G01J 1/42
(52) U.S. Cl. .................... 359/239; 250/205; 250/227.11; 359/187
(58) Field of Search ................................... 359/187, 239; 250/205, 216, 227.11; 385/27

(56) References Cited

U.S. PATENT DOCUMENTS 5,043,745 * 8/1991 Inoue et al. ........................... 347/246

FOREIGN PATENT DOCUMENTS

| 4-150324 | 5/1992 | (JP) | H04B/10/04 |
| 8-37499 | 2/1996 | (JP) | H04B/10/22 |
| 10-336114 | 12/1998 | (JP) | H04B/10/14 |
| 2000332691 A | * 11/2000 | (JP) | H04B/10/14 |

* cited by examiner

Primary Examiner—Georgia Epps
Assistant Examiner—David N. Spector
(74) Attorney, Agent, or Firm—McGuireWoods LLP

(57) ABSTRACT

An optical output control circuit enables intensity of light signal to be kept constant, and enables various kind of additive function to be provided. A quantity of light detection circuit part includes a light-electricity conversion circuit, an A-D conversion circuit for digital converting level of analog voltage outputted from the light electricity conversion circuit. An attenuator control circuit gives attenuation quantity in accordance with value of digital control signal from CPU to an variable light attenuator. A correlation table sets relationship between digital value inputted from the quantity of light detection circuit part and an output light signal intensity (output level), and relationship between value of digital control signal and attenuation quantity of variable light attenuator beforehand. The CPU determines the attenuation quantity in the variable light attenuator from the digital signal, thus it is unnecessary to repeat fine adjustment, the CPU sets the output level to the desired value by one time control.

25 Claims, 9 Drawing Sheets

FIG. 3A

| OUTPUT LEVEL | DIGITAL VALUE |
|---|---|
| + 4.0dBm | 0100 0000 0000 |
| + 3.9dBm | 0011 1111 0010 |
| + 3.8dBm | 0011 1111 1100 |
| ⋮ | ⋮ |
| 0dBm | 0010 0000 0000 |
| − 0.1dBm | 0001 1111 1100 |
| ⋮ | ⋮ |
| −27.9dBm | 0000 0000 0011 |
| −28.0dBm | 0000 0000 0000 |

FIG. 3B

| ATTENUATION QUANTITY | DIGITAL CONTROL SIGNAL |
|---|---|
| 10.0dB | 0110 0100 |
| 9.9dB | 0100 1100 |
| ⋮ | ⋮ |
| 0dB | 0000 0000 |

FIG. 8

| WAVELENGTH (ch) | INSERTION LOSS |
|---|---|
| $\lambda_1$ | 4.5dB |
| $\lambda_2$ | 5.0dB |
| ⋮ | ⋮ |
| $\lambda_n$ | 8.5dB |

OPTICAL OUTPUT CONTROL CIRCUIT

BACKGROUND OF THE INVENTION

The present invention relates to an optical output control circuit which is capable of being kept intensity of a light signal to required value.

Description of the Prior Art

When it causes intensity of a light signal which is sent out to an optical fiber to be set to constant value, an optical output control circuit for keeping intensity of the light signal to constant value is employed. Generally, in order to set intensity of the light signal to the constant value, an optical output control circuit which can keep intensity of the signal light to the constant value is employed. Further, when it causes the inputted light signal to be supplied to an optical module which is limited in reception level of the light signal, intensity of the input light is necessary to be lowered. In such the case, the optical output control circuit is employed.

FIG. 1 is a block diagram showing a constitution of a conventional optical output control circuit. The optical output control circuit 200 shown in FIG. 1 sets intensity of the light signal inputted from the optical fiber 201 to the prescribed value. The optical output control circuit outputs the light signal with the prescribed value to the optical fiber 207. In the optical output control circuit 200, the inputted light signal is inputted to an optical branching part 203 while passing through a variable light attenuator 202. The optical branching part 203 inputs the light signal to the optical fiber 207 and a light-electricity conversion circuit 206 while branching the inputted light signal.

The light-electricity conversion circuit 206 converts the light signal as the inputted monitor light into an analog electric signal. Intensity of the monitor light is correlated with amplitude of the analog electric signal. Further, the analog electric signal is inputted to an attenuator control circuit 205. The attenuator control circuit 205 prepares control signal for specifying attenuation quantity of the variable light attenuator 202 in accordance with amplitude level of the analog electric signal to output to the variable light attenuator 202. The variable light attenuator 202 sets attenuation quantity in accordance with the control signal.

The attenuator control circuit 205 outputs a control signal instructing that it causes the attenuation quantity to be increased when the amplitude level of the analog electric signal is larger than a prescribed value, while when the amplitude level of the analog electric signal is smaller than the prescribed value, the attenuator control circuit 205 outputs the control signal instructing that it causes the attenuation quantity to be reduced. According to such control, the intensity of the light signal outputted to the optical fiber 207 is kept to prescribed value. Further, such the optical output control circuit is disclosed in the Japanese Patent Application Laid-Open No. HEI 4-150324 or the Japanese Patent Application Laid-Open No. HEI 10-336114.

The conventional optical output control circuit can merely implement an optical output constant control for keeping intensity of the light signal to the constant value. The conventional optical output control circuit can not implement more wider control than the above described optical output constant control. For instance, although the optical output control circuit it self prepares a monitor signal concerning intensity of the light signal, when there is a demand that it causes intensity of output light to be monitored in external part, it is incapable of replying to the demand that it causes intensity of output light to be monitored at the external part simply by using the conventional optical output control circuit. For instance, generally a photodiode (PD) is employed as the light-electricity conversion circuit 206 which generates a monitor signal. However, input-output characteristic of the photodiode (PD) is not linear, consequently, even though it causes output of PD to be observed at the external part, it is incapable of recognizing intensity of the light signal immediately from the monitor signal. Further, there exists dispersion in the characteristic of the PD, thus it is not necessarily that intensity of the light signal outputted from respective optical output control circuits is identical with each other, even though the monitor signal from the plurality of optical output control circuits indicates the same analog electric level.

Furthermore, the Japanese Patent Application Laid-Open No. HEI 8-37499 discloses control circuit which keeps intensity of the light signal into a prescribed value according to digital processing by CPU. Conversion table is included in the control circuit. However, the control circuit obtains attenuation quantity from the conversion table in accordance with the monitor level on that occasion, further the control circuit confirms the output light intensity in accordance with obtained attenuation quantity. Consequently, in order to obtain required output light intensity, it should execute frequently that it causes light intensity to be confirmed while changing attenuation quantity very little by very little. Moreover, the control circuit is not considered concerning signal monitoring and so forth from the external part.

SUMMARY OF THE INVENTION

In view of the foregoing, it is an object of the present invention, in order to overcome the above mentioned problems, to provide an optical output control circuit which enables intensity of the light signal to be kept constant in a simple way, and which is capable of providing various kinds of additive functions.

According to a first aspect of the present invention, in order to achieve the above mentioned object, there is provided an optical output control circuit which comprises a level varying means for varying input level of a light signal, a monitoring means for monitoring output level of the light signal, a variable quantity control means for controlling variable quantity of the level varying means in accordance with a monitor signal from the monitoring means, an A-D conversion means for generating a digital signal while digital-converting the monitor signal, a table to which a data is set, such the data enabling variable quantity corresponding to desired value of the output level of the light signal to be determined from the digital signal, and a data processing means retrieving the table on the basis of the digital signal outputted from the A-D conversion means, before determining variable quantity in order to harmonize output level of the light signal with the desired value to supply to the variable quantity control means.

According to a second aspect of the present invention, in the first aspect, there is provided an optical output control circuit, wherein the table in which relationship between respective digital signals and respective output level, and relationship between respective digital control signals and respective variable quantities in the level varying means are set.

According to a third aspect of the present invention, in the first or second aspect, there is provided an optical output control circuit, wherein there is provided an interface means for outputting digital signal outputted by the A-D conversion means.

According to a fourth aspect of the present invention, in the third aspect, there is provided an optical output control circuit, wherein the interface means is a RAM (Random Access Memory).

According to a fifth aspect of the present invention, in any of the first to the fourth aspect, there is provided an optical output control circuit, wherein the table in which correction data for correcting the output level is set.

According to a sixth aspect of the present invention, in the fifth aspect, wherein the correction data includes data indicating insertion loss in every respective wavelengths in an optical multiplexer connected to an output side.

According to a seventh aspect of the present invention, in the sixth aspect, there is provided an optical output control circuit, wherein the data processing means corrects the output level in such a way that the data processing means executes processing of adding the insertion loss in accordance with wavelength of the light signal to be treated to the desired value.

According to an eighth aspect of the present invention, there is provided an optical output control method according to an optical output control circuit which comprises the steps of varying an input level of a light signal by a level varying means, monitoring an output level of the light signal by a monitoring means, controlling variable quantity of the level varying means in accordance with a monitor signal from the monitoring means by a variable quantity control means, generating a digital signal while digital converting the monitor signal by an A-D conversion means, storing data in a table to which a data is set, such the data enabling variable quantity corresponding to desired value of the output level of the light signal to be determined from the digital signal, and retrieving the table on the basis of the digital signal outputted from the A-D conversion means, before determining variable quantity in order to harmonize output level of the light signal with the desired value to supply to the variable quantity control means by a data processing means.

The above and further objects and novel features of the invention will be more fully understood from the following detailed description when the same is read in connection with the accompanying drawings. It should be expressly understood, however, that the drawings are for purpose of illustration only and are not intended as definition of the limits of the invention.

BRIEF DESCRIPTION OF THE DRAWINGS

FIGS. 3A and 3B are explanation views showing constitution examples, FIG. 3A is table showing relationship of digital value-output level set in correlation table 8, and FIG. 3B is a table showing relationship of digital control signal-attenuation quantity;

FIG. 8 is an explanation view showing one example of a correction table; and

DETAILED DESCRIPTION OF THE PREFERRED EMBODIMENTS

A preferred embodiment of the present invention will be described in detail in accordance with the accompanying drawings.

Figure 1:
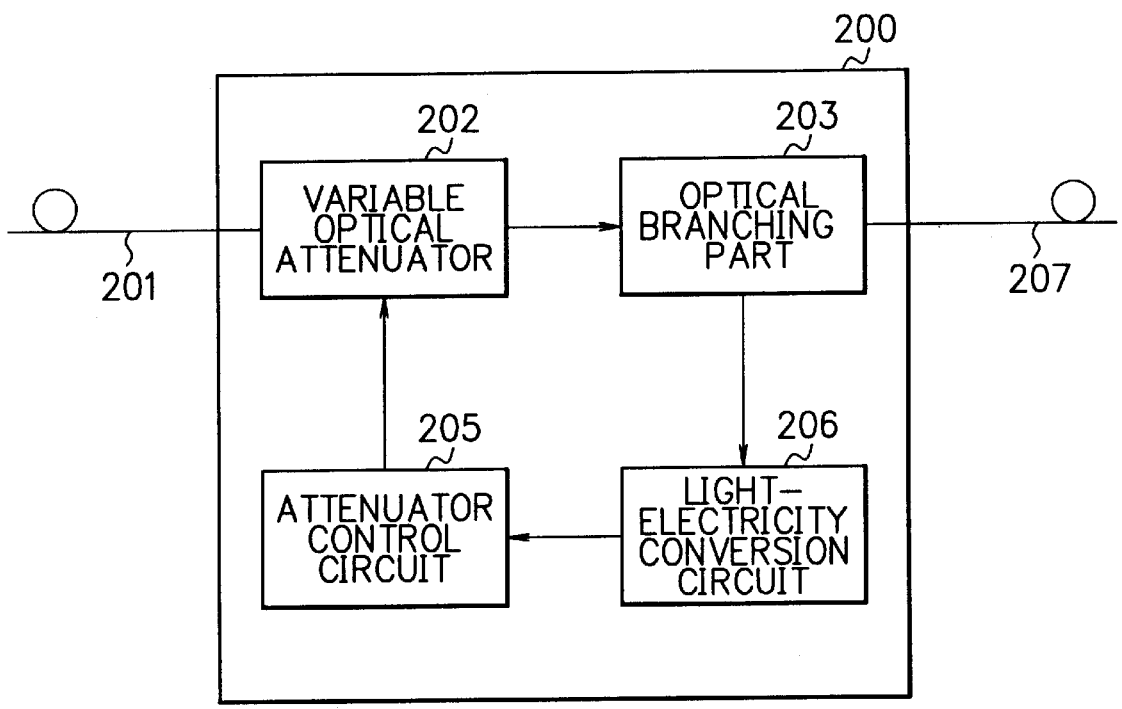
FIG. 1 is a block diagram showing a constitution of a conventional optical output control circuit.
Figure 2:
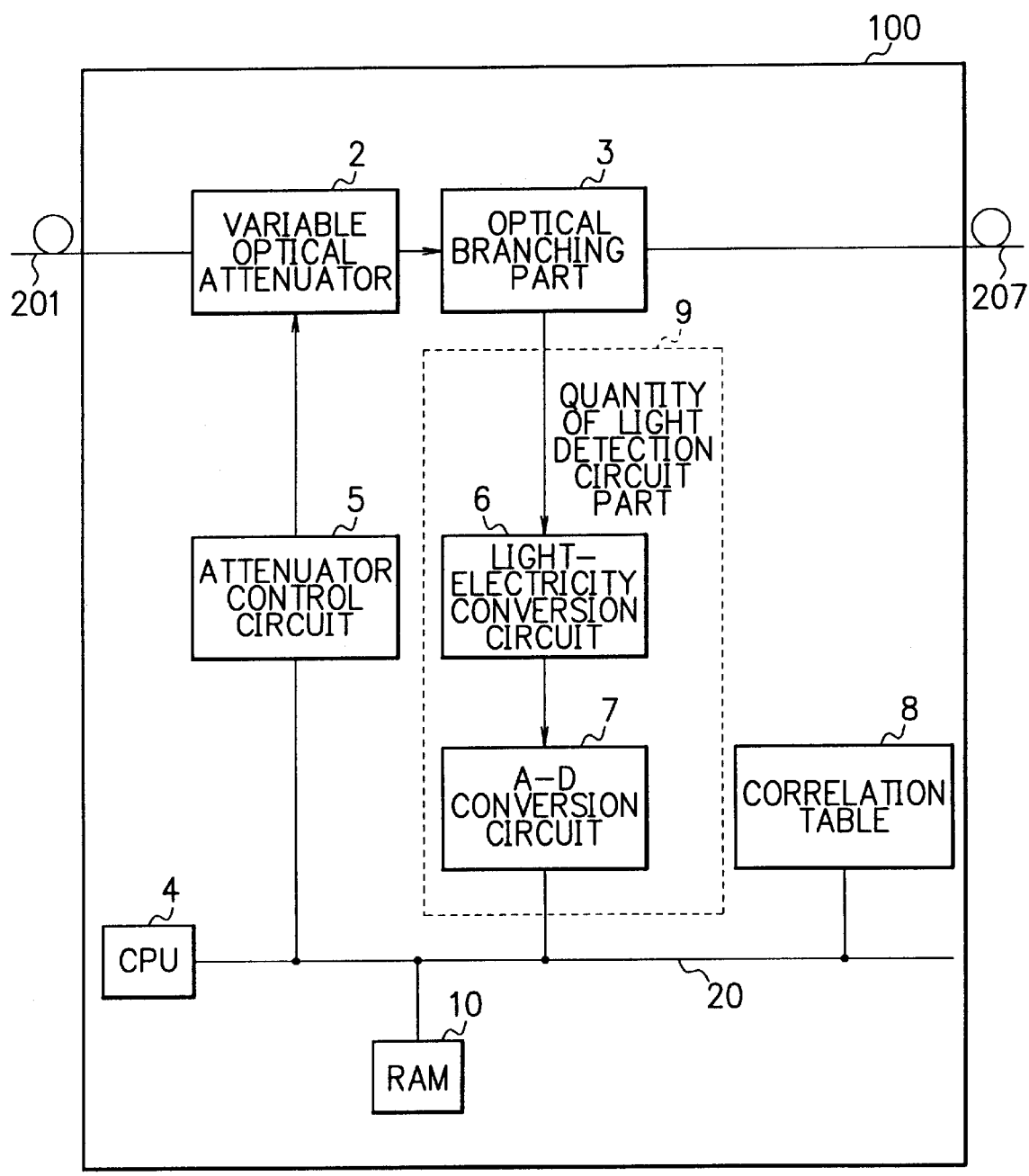
FIG. 2 is a block diagram showing one constitution example of an optical output control circuit according to the present invention.

FIG. 2 is a block diagram showing one constitution example of an optical output control circuit according to the present invention. In the optical output control circuit 100 shown in FIG. 2, a light signal inputted from an optical fiber 201 is inputted to an optical branching part 3 while passing through a variable light attenuator 2. The optical branching part 3 inputs the light signal to an optical fiber 207 and a quantity of light detection circuit part 9 while branching the inputted light signal. The quantity of light detection circuit part 9 comprises a light-electricity conversion circuit 6, and an A-D conversion circuit 7 for digital-converting level of analog voltage which the light-electricity conversion circuit outputs.

Further, the A-D conversion circuit 7 is connected to the CPU 4 through a bus 20. An attenuator control circuit 5, a correlation table 8, and a RAM 10 are connected to the bus 20. The attenuator control circuit 5 gives attenuation quantity to the variable light attenuator 2 in accordance with value of a digital control signal from the CPU 4. Relationship between digital value outputted from the quantity of light detection circuit part 9 and output light signal intensity (output level) is set in the correlation table 8 beforehand. Relationship between value of the digital control signal and attenuation quantity of the variable light attenuator 2 is set in the correlation table 8 beforehand. The RAM 10 is for instance a 2-port RAM. The RAM 10 enables data switching to be performed between the optical output control circuit and the external equipment.

FIG. 3A is a table showing relationship between digital value and output level set in the correlation table 8. FIG. 3B is a table showing relationship between digital control signal and attenuation quantity set in the correlation table 8. Respective numerical values shown in FIGS. 3A, and 3B are merely values of example. In FIG. 3A, the table of "the digital value & the output level" shows the digital values corresponding to respective levels divided in every 0.1 dBm. In FIG. 3B, the table of "the digital control signal & the attenuation quantity" shows attenuation quantity divided in every 0.1 dB and digital control signal specifying each attenuation quantity.

There will be described relationship between "the digital value & the output level". For instance, it causes attenuation quantity of the variable light attenuator 2 to be 0 (zero). Under this condition, it causes input light signal intensity (input level) of test light to be varied variously. The output values of the quantity of light detection circuit part 9 corresponding to respective input levels are obtained. Thus, the relationship between "the digital value & the output level" is determined.

Here, input level range of test light is set somewhat widely with respect to range of input level to be inputted. It is suitable to set the lower side of the input level range of the test light more widely. Namely, in the table of "the digital value & the output lever", it causes lower limit of the digital value is taken to be considerably lower value than level with practical possibility. According to this disposition, when the digital value outputted from the quantity of light detection circuit part 9 indicates a value which is considerably lower than level of range to be inputted, it is capable of judging that some trouble or other occur. Further, the CPU 4 is capable of transmitting occurrence of trouble to the external equipment through the RAM 10. Moreover, the relationship between "the digital control signal & the attenuation quantity" is determined on the basis of characteristic of the variable light attenuator 2.

Figure 4:
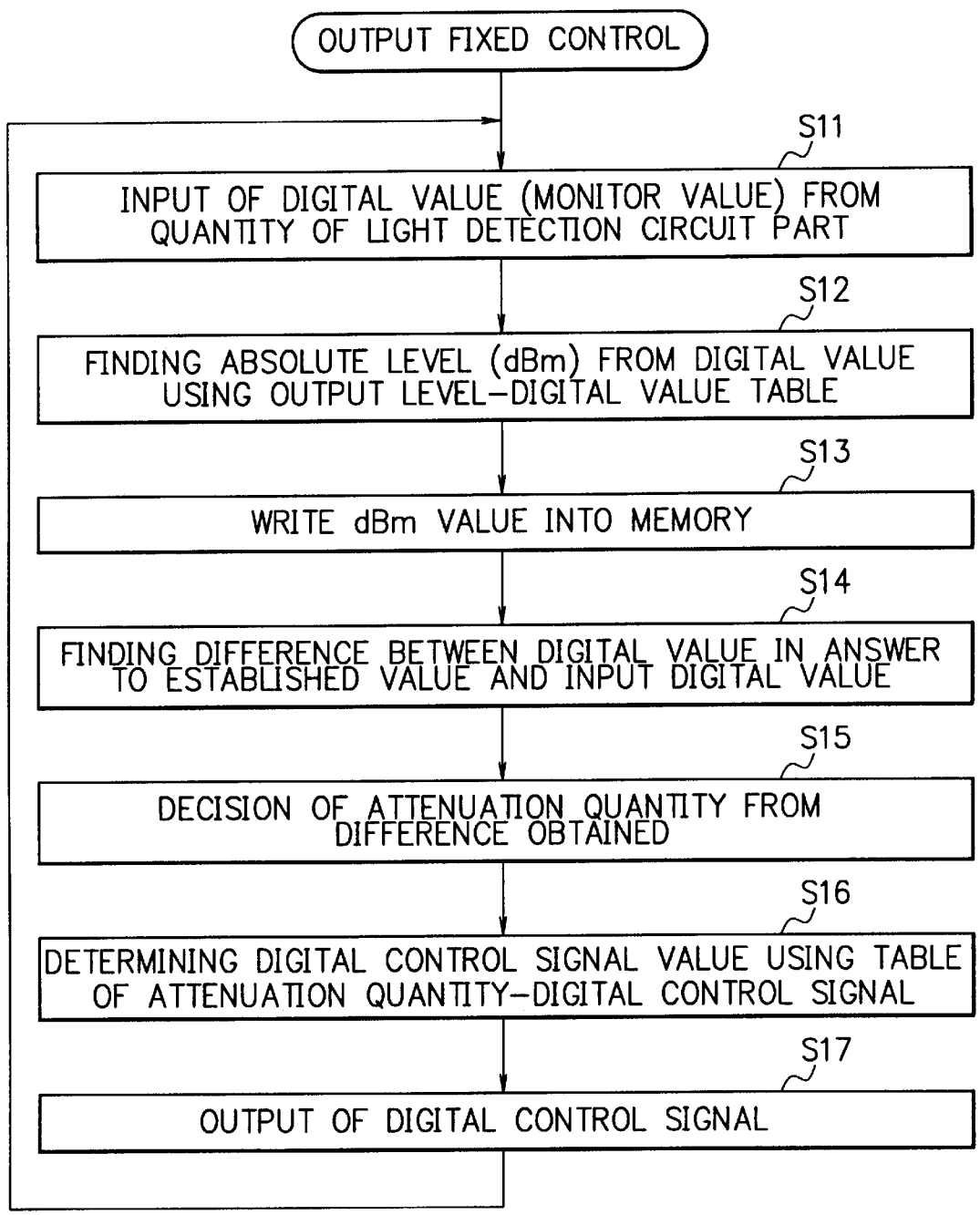
FIG. 4 is a flowchart showing operation of the optical output control circuit.

Next, there will be described operation of the optical output control circuit 100 while referring to flowchart of FIG. 4. Processing of STEP S11 to S17 shown in FIG. 4 is executed with prescribed time interval (for instance time interval of 1 sec). In the optical output control circuit 100, the light signal inputted is inputted to the optical branching part 3 while passing through the variable light attenuator 2. The optical branching part 3 causes the inputted light signal to be inputted to the optical fiber 207 and the quantity of light detection circuit part 9 while branching the inputted light signal. In the quantity of light detection circuit part 9, the light-electricity conversion circuit 6 converts the light signal inputted as the monitor light into an analog electric signal. Intensity of the monitor light is correlated with an amplitude of the analog electric signal. An A-D conversion circuit 7 causes level of analog voltage outputted from the light-electricity conversion circuit 6 to be performed digital conversion. Further, the CPU 4 inputs therein the digital signal from the A-D conversion circuit 7 through the bus 20 (STEP S11).

The CPU 4 retrieves the table of "the digital value & the output level" on the basis of value of the digital signal inputted to extract output level in accordance with the value of the digital signal (STEP S12). Further, the CPU 4 writes output level represented by dB-expression into the RAM 10 (STEP S13). The processing of the STEP S12, and STEP S13 is not related directly to the output level constant control. In the external equipment, it is capable of monitoring the output level easily by the fact that the output level represented by dB-expression is set to the RAM 10.

Further, the CPU 4 obtains difference between a set value (desired value) and an output level corresponding to the value of inputted digital signal (STEP S14), before determining attenuation quantity of the variable light attenuator 2 (STEP S15). Here, the set value is a digital value corresponding to required output level. The CPU 4 determines a digital control signal in accordance with obtained attenuation quantity while using the table of the "digital control signal & the attenuation quantity" (STEP S16). Further, the CPU 4 outputs the determined digital control signal to the attenuator control circuit 5 through the bus 20. The attenuator control circuit 5 controls attenuation quantity of the variable light attenuator 2 in such a way that the variable light attenuator 2 attenuates the input level in accordance with the attenuation quantity in answer to the digital control signal.

For instance, on the supposition that the CPU 4 inputs therein "010000000000" as the digital signal from the quantity of light detection circuit part 9. Referring to the table of "the digital value & the output lever" shown in FIG. 3A, the output level corresponding to this value is "+4 dBm". Here, on the supposition that the set value is "0 dBm", the CPU 4 finds that it causes the input level to be attenuated by "4 dB". The CPU 4 acquires the digital control signal corresponding to attenuation quantity "4 dB" from the table of "the digital control signal & the attenuation quantity", before outputting the digital control signal to the attenuator control circuit 5. The attenuator control circuit 5 controls so as to cause the attenuation quantity of the variable light attenuator 2 to be "4 dB", thus the output level agrees with the set value.

The above operation example is that the attenuation quantity of the variable light attenuator 2 is "0 dB". When the attenuation quantity of the variable light attenuator 2 is set to another value with the exception of "0 dB", the CPU 4 sets new attenuation quantity in the digital control signal determination processing of STEP S16. The new attenuation quantity is determined in such a way that difference is obtained between the set attenuation quantity and dB-value to be attenuated as the new attenuation quantity. For instance, the attenuation quantity of the variable light attenuator 2 is already set to 2 dB, on this occasion, the CPU 4 finds that it causes the input level to be attenuated by 4 dB, before the CPU 4 selects the digital control signal corresponding to the attenuation quantity 6 dB.

In this embodiment, the CPU 4 refers to the table on the basis of the digital value as the monitor signal, before determining the digital control signal in order to agree the output level with the set value. The digital control signal corresponds to the attenuation quantity of the variable light attenuator 2 with one by one correspondence, therefore, the output level becomes to agree with the set value immediately. Namely, it is capable of harmonizing the output level with the set value by one time control operation.

Figure 5:
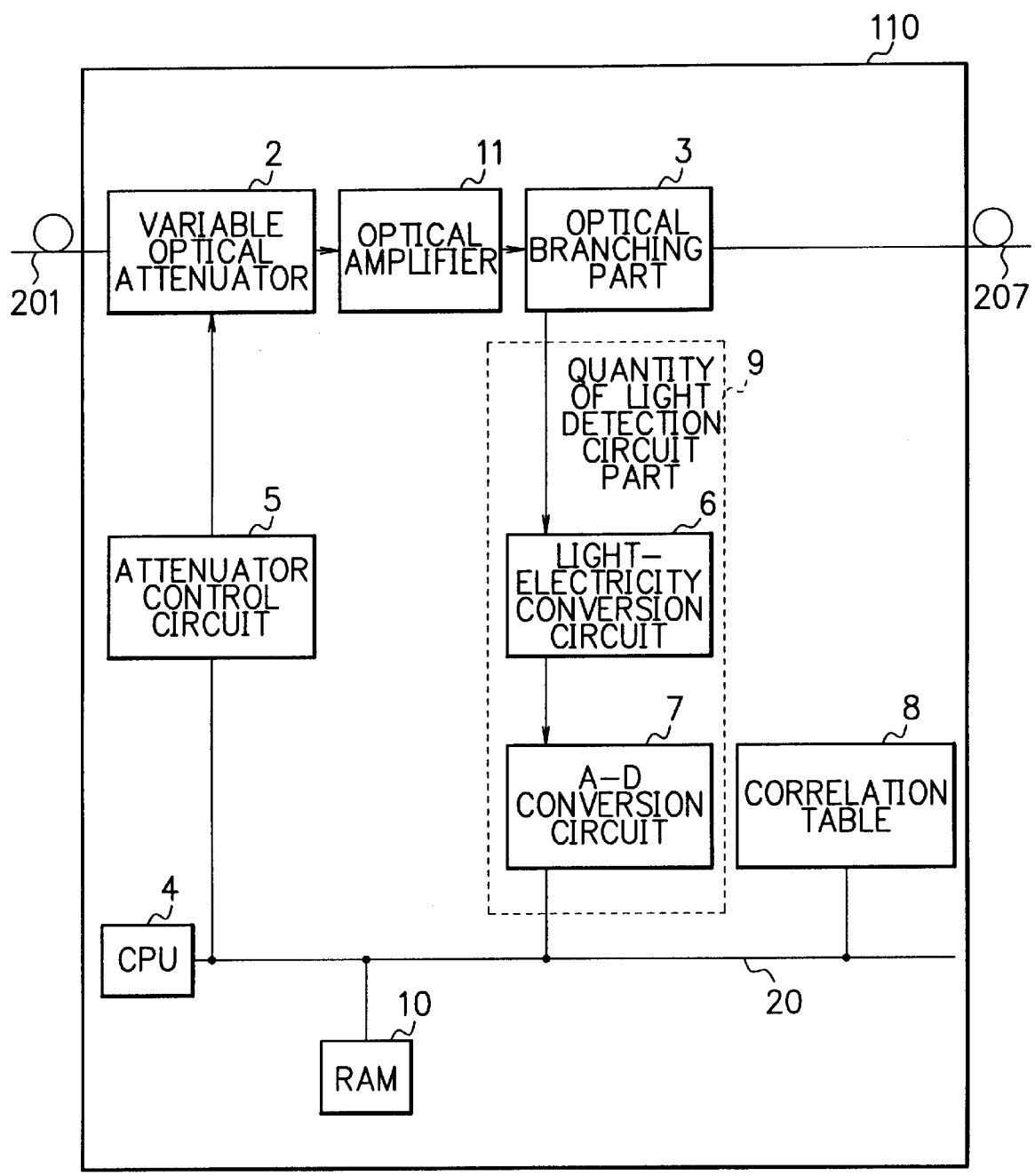
FIG. 5 is a block diagram showing a constitution example of another optical output control circuit.

In the optical output control circuit 100 shown in FIG. 2, the circuit 100 outputs the light signal with the output level of the constant level while attenuating the input level. However, it is also capable of outputting the light signal with constant output level of higher level than the input level. On this occasion, as shown in FIG. 5, for instance, it is suitable to employ an optical output control circuit 110 in which an optical amplifier 11 is located at the rear stage of the variable light attenuator 2. In this constitution, the CPU 4 is capable of keeping the output level of the light signal constant, while operating in the same way as the case of the optical output control circuit 100 shown in FIG. 2.

Figure 6:
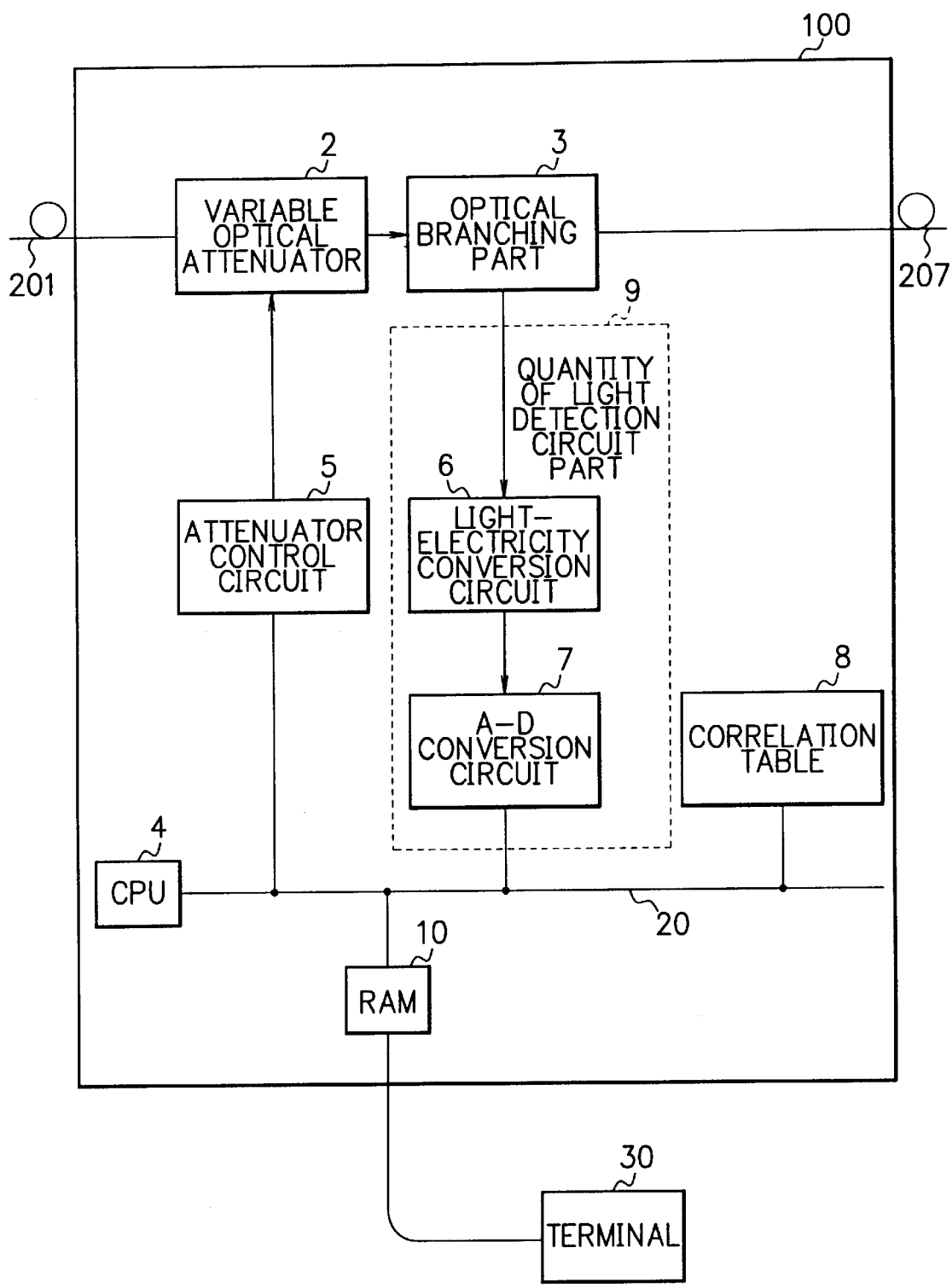
FIG. 6 is a block diagram showing constitution in which an external terminal is connected to the optical output control circuit.

FIG. 6 is a block diagram showing a constitution in which external terminal 30 is connected to the optical output control circuit 100. In this example, the terminal 30 is connected to the optical output control circuit 100 while passing through the RAM of 2-port constitution. As mentioned above, since the value with dB-expression about the output level of the light signal is stored in the RAM 10, the terminal 30 is capable of recognizing the output level immediately by reading the value from the RAM 10. For instance, the terminal 30 displays the value on an indicator from the RAM 10.

Further, the terminal 30 is also capable of providing the set value to the optical output control circuit 100 through the RAM 10. On this occasion, in the processing of STEP S14, the CPU 4 reads out the set value from the RAM 10, before employing the digital value in accordance with the set value read out previously. Thus, it enables the set value to be altered easily in accordance with instruction from the terminal 30. Furthermore, in the constitution shown in FIG. 6, the optical output control circuit 100 is shown as example. However, also the optical output control circuit 110 is capable of being connected to the terminal 30 shown in FIG. 5.

Figure 7:
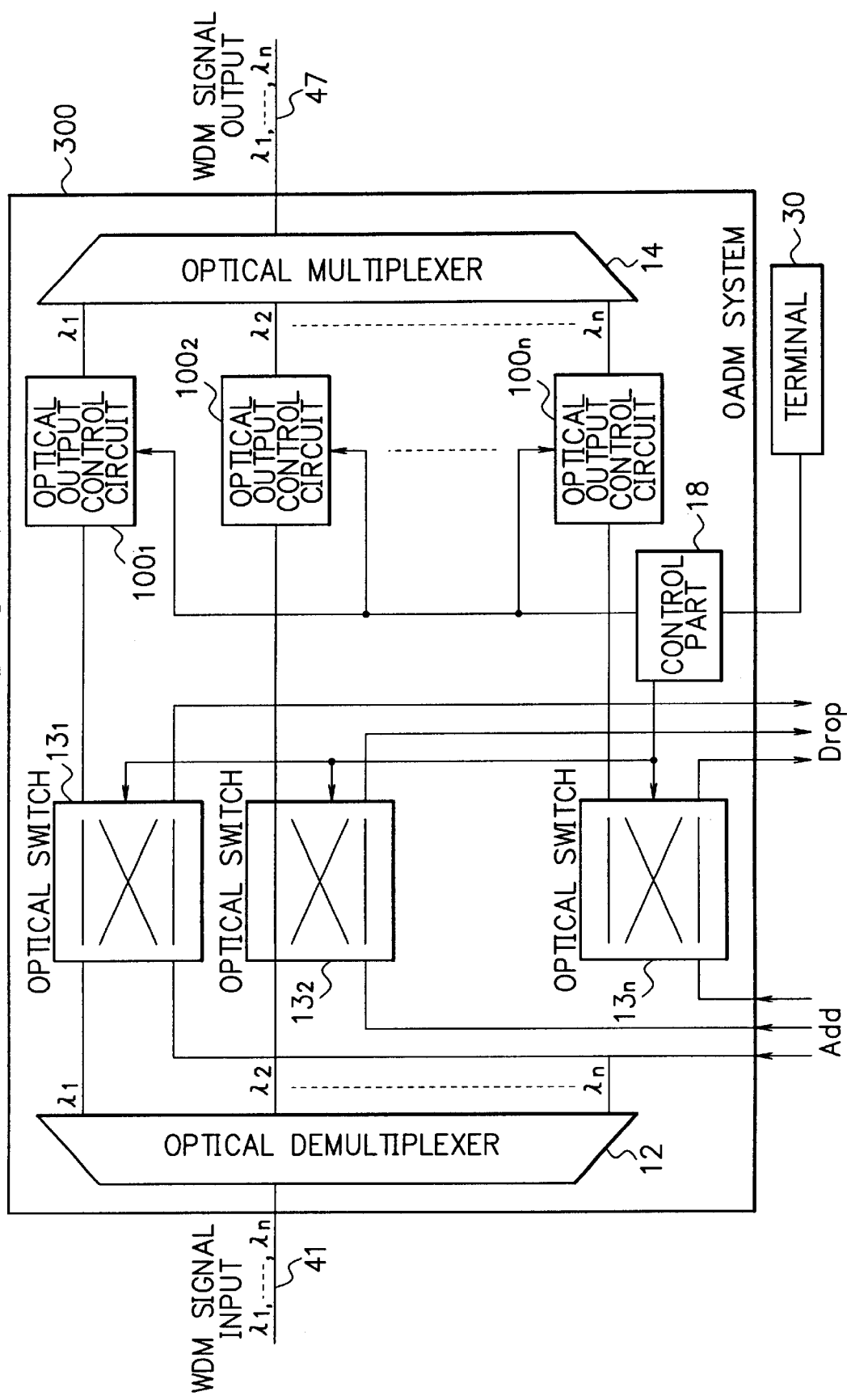
FIG. 7 is constitution view showing system constitution in the case where it causes the optical output control circuit according to the present invention to be applied to the OADM system of the WDM transmission.

FIG. 7 is a constitution view showing system constitution in the case where it causes the optical output control circuit according to the present invention to be applied to OADM (Optical Add Drop Multiplexer) system narrow band-width wavelength division multiplexing (NB-WDM) transmission. The OADM system is a system in which it causes the light signal to be pulled out at In-Line station (switching station), or in which it causes the light signal to be added at the In-Line station (switching station), with respect to the light signal of optional wavelength from among n-wave of WDM signal transmitted in WDM transmission. The OADM system is capable of giving additive value to the NB-WDM transmission system.

In the OADM system 300 shown in FIG. 7, wavelength division multiplexing signal from an optical fiber 41 is demultiplexed into signal of each wavelength of $\lambda_1$, $\lambda_2, \ldots, \lambda_n$ by an optical demultiplexer 12. The respective signals are inputted to "2×2" of optical switches $13_1$, $13_2, \ldots, 13_n$. In each optical switch $13_1, 13_2, \ldots, 13_n$, the light signal for the sake of "Add" is inputted to the other side input. Further, in each optical switch $13_1, 13_2, \ldots, 13_n$, respective one side outputs are inputted to the optical output control circuits $100_1, 100_2, \ldots, 100_n$, while the other side outputs are pulled out as "drop-signal".

It is suitable that constitution of the optical output control circuits $100_1, 100_2, \ldots, 100_n$, is identical with constitution of the optical output control circuit 100 shown in FIG. 2, or identical with constitution of the optical output control circuit 110 shown in FIG. 5. Output of the optical output control circuits $100_1, 100_2, \ldots, 100_n$ is multiplexed by the optical multiplexer 14, before being outputted to the optical fiber 47.

In such the system, it enables the light signal of optional wavelength to be passed as it is, or it enables the light signal of optional wavelength to be pulled out, or it enables the light signal of optional wavelength to be substituted according to control of a control part 18 of the OADM system 300.

The external terminal 30 is capable of being connected to the OADM system 300. For instance, the terminal 30 is connected to the control part 18. Further, the control part 18 is capable of performing exchange of data to the respective CPU 4 therebetween through the RAM 10 of the optical output control circuits $100_1, 100_2, \ldots, 100_n$. Consequently, the terminal 30 is capable of monitoring the output level of the optical output control circuits $100_1, 100_2, \ldots, 100_n$ through the control part 18. The terminal 30 is capable of giving the set value through the control part 18. Further, it is suitable that the terminal 30 is connected to respective RAM 10 of the optical output control circuits $100_1$, $100_2, \ldots, 100_n$. Further, it is capable of constituting that the processing of the CPU 4 of respective optical output control circuits $100_1, 100_2, \ldots, 100_n$ burdens the control part 18.

Generally, an optical multiplexer 14 has insertion loss. The value of the insertion loss indicates different value in every wavelength. In the WDM signal sent out to the optical fiber 47, it is desirable that intensity of respective wavelength is equal. However, when respective optical output control circuits $100_1, 100_2, \ldots, 100_n$ make the intensity of wavelength the same level as the output level, the intensity of respective wavelength is dissipated in the WDM signal sent out to the optical fiber 47.

For that reason, the respective optical output control circuits $100_1, 100_2, \ldots, 100_n$ store therein correction table in which insertion loss in every respective channels (respective wavelength) are set. FIG. 8 is an explanation view showing one example of correction table. As shown in FIG. 8, relationship between each wavelength of $\lambda_1, \lambda_2, \ldots, \lambda_n$ and the insertion loss is set in the correction table. Further, respective values shown in FIG. 8 are mere examples. Practically, value is set in accordance with characteristic of the optical multiplexer 14 which is in use.

Figure 9:
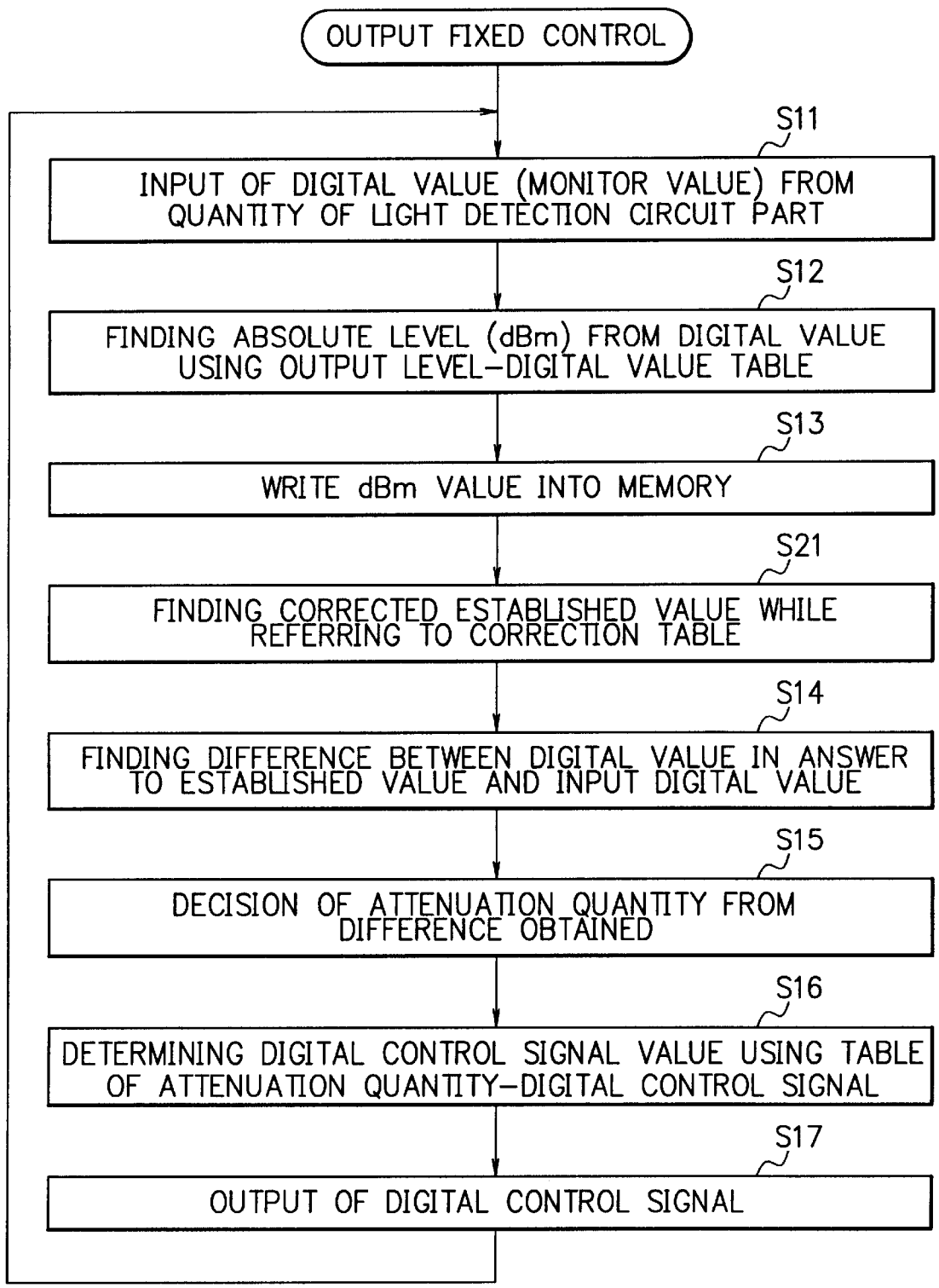
FIG. 9 is a flowchart showing output constant control while using correction table.

FIG. 9 is a flowchart showing output constant control of the CPU 4 using the correction table. In this case, the signal level sent out to the optical fiber 47 is taken to be the set value. The CPU 4 inputs therein the digital signal from the A-D conversion circuit 7 (STEP S11). The CPU 4 retrieves the table of the digital value-output level on the basis of the value of inputted digital signal to extract output level in accordance with the value of the digital signal (STEP S12). Further, the CPU 4 writes the output level with dB-expression to the RAM 10 (STEP S13).

In this case, the CPU 4 obtains correction value of the set value while referring to the correction table (STEP S21). The CPU 4 obtains difference between the correction value and the output level corresponding to the value of the digital signal inputted previously (STEP S14), before determining attenuation quantity of the variable light attenuator 2 in accordance with such difference (STEP S15). Further, the CPU 4 determines the digital control signal in accordance with the attenuation quantity obtained previously using the table of "the digital control signal & the attenuation quantity" (STEP S16). The CPU 4 outputs the digital control signal determined previously to the attenuator control circuit 5 through the bus 20.

For instance, on the supposition that the set value namely the desired value of the signal level sent out to the optical fiber 47 is "20 dBm". Further, on the supposition that the light signal level inputted to respective optical output control circuits $100_1, 100_2, \ldots, 100_n$ is dissipated with the range of for instance "−12 dBm to −19 dBm". On the supposition that the processing of STEP S21 is not executed, dispersion with the range of "−12 dBm to −19 dBm" of the input level is dissolved according to processing (exception for S21) of STEP S11 to S17, thus the output level of the light signal outputted from respective optical output control circuits $100_1, 100_2, \ldots, 100_n$ become uniform value. However, light intensity of respective wavelength in the WDM signal outputted by the optical multiplexer 14 is dissipated.

However, in this case, the optical output control circuit $100_1$ which inputs therein the light signal with the wavelength $\lambda_1$, in the processing of STEP S21, finds that the insertion loss with respect to the wavelength $\lambda_1$ is 4.5 dB from the correction table. Thus, the correction value is taken to be −14.5 dB. Further, the optical output control circuit $100_2$ which inputs therein the light signal with the wavelength $\lambda_2$, in the processing of STEP S21, finds that the insertion loss with respect to the wavelength $\lambda_2$ is 5.0 dB from the correction table. Thus, the correction value is taken to be −15.0 dB. Furthermore, the respective CPU 4 outputs the digital control signal to the attenuator control circuit 5 in such a way that the output level agrees with the correction value.

Consequently, in the WDM signal from the optical multiplexer 14 which multiplexes the light signal outputted from respective optical output control circuits $100_1, 100_2, \ldots, 100_n$, the light intensity of the respective channels becomes uniform. As described above, the respective optical output control circuits $100_1, 100_2, \ldots, 100_n$ implement output level constant control while taking the insertion loss of the optical multiplexer 14 into account. In this case, the respective optical output control circuits $100_1, 100_2, \ldots, 100_n$ output the light signal whose levels are different. However, it is suitable that the constitution thereof is identical with each other.

There is possibility that dispersion occurs with respect to the signal level of respective channels of the WDM signal inputted while passing through optical transmission line. Further, also there is possibility that dispersion occurs in the level of the signal added. However, according to this embodiment, it is capable of dissolving dispersion of the light signal level, due to respective optical output control circuits $100_1, 100_2, \ldots, 100_n$. Furthermore, it enables the signal level of the respective channels to be made uniform in the WDM signal outputted, thus, it is capable of reducing possibility of occurrence of the data error in the reception side, even though long-distance transmission is executed with respect to the WDM output signal.

Further, in this case, since the output level is written in the RAM 10, in the processing of STEP S12, S13, the external terminal 30 is capable of recognizing immediately the output level of the light signal from the respective optical output control circuits $100_1, 100_2, \ldots, 100_n$. Consequently, even though there occurs operation trouble from among the respective optical output control circuits $100_1, 100_2, \ldots, 100_n$, it is detected immediately in the terminal 30. Furthermore, alteration of the set value is also capable of being performed from the terminal 30 easily.

In the above described respective embodiments, since the CPU 4 determines the attenuation quantity (it is not relative quantity in order to specify increase or decrease of attenuation quantity, it causes the attenuation quantity it self of the attenuator to be determined), it is not necessary to repeat fine adjustment frequently, thus the output level is set to required value by one time control. Further, the output level is written in the RAM 10 with dB-expressions, accordingly, the external equipment is capable of monitoring easily the output level through the RAM 10. Further, it is easy to change the set value from the external equipment. Moreover, the RAM 10 is one example of the interface means. It is also capable of performing exchange of data to the external equipment therebetween by the another interface means.

Further, according to the present embodiment, it is capable of realizing various kinds of additive function except for the function materialized in the above described respective embodiments. For instance, not only it causes the output level to be controlled constantly, but also it causes complicated control to be performed that when the output level harmonizes with the certain condition, it causes the optical output to be shut down, thus it becomes possible to realize the optical output control widely.

As described above, according to the embodiments, the optical output control circuit comprises the A-D conversion means for generating the digital signal while digital converting the monitor signal in order to monitor the output light signal, the table to which data is set, in such data, it enables variable quantity in accordance with the desired value of the output level of the light signal to be determined, and the data processing means retrieving the table on the basis of the digital signal outputted by the A-D conversion means, before supplying variable quantity to the variable quantity control means while determining the variable quantity for harmonizing the output level of the light signal with the desired value. Thus, the optical output control circuit enables intensity of the light signal to be kept constant easily, and enables various kind of additive function to be provided.

What is claimed is:

1. An optical output control circuit comprising:
 a level varying means for varying input level of a light signal;
 a monitoring means for monitoring output level of the light signal;
 a variable quantity control means for controlling variable quantity of said level varying means in accordance with a monitor signal from said monitoring means;
 an A-D conversion means for generating a digital signal while digital converting the monitor signal;
 a table to which a data is set, such the data enabling variable quantity corresponding to desired value of the output level of the light signal to be determined from said digital signal; and
 a data processing means retrieving said table on the basis of the digital signal outputted from said A-D conversion means, before determining variable quantity in order to harmonize output level of the light signal with the desired value to supply to said variable quantity control means.

2. An optical output control circuit as claimed in claim 1, wherein said table in which relationship between respective digital signals and respective output level, and relationship between respective digital control signals and respective variable quantities in said level varying means are set.

3. An optical output control circuit as claimed in claim 1, wherein there is provided an interface means for outputting digital signal outputted by said A-D conversion means.

4. An optical output control circuit as claimed in claim 2, wherein there is provided an interface means for outputting digital signal outputted by said A-D conversion means.

5. An optical output control circuit as claimed in claim 3, wherein said interface means is a RAM (Random Access Memory).

6. An optical output control circuit as claimed in claim 4, wherein said interface means is a RAM (Random Access Memory).

7. An optical output control circuit as claimed in claim 1, wherein said table in which correction data for correcting the output level is set.

8. An optical output control circuit as claimed in claim 2, wherein said table in which correction data for correcting the output level is set.

9. An optical output control circuit as claimed in claim 3, wherein said table in which correction data for correcting the output level is set.

10. An optical output control circuit as claimed in claim 4, wherein said table in which correction data for correcting the output level is set.

11. An optical output control circuit as claimed in claim 5, wherein said table in which correction data for correcting the output level is set.

12. An optical output control circuit as claimed in claim 6, wherein said table in which correction data for correcting the output level is set.

13. An optical output control circuit as claimed in claim 7, wherein said correction data includes data indicating insertion loss in every respective wavelengths in an optical multiplexer connected to an output side.

14. An optical output control circuit as claimed in claim 8, wherein said correction data includes data indicating insertion loss in every respective wavelengths in an optical multiplexer connected to an output side.

15. An optical output control circuit as claimed in claim 9, wherein said correction data includes data indicating insertion loss in every respective wavelengths in an optical multiplexer connected to an output side.

16. An optical output control circuit as claimed in claim 10, wherein said correction data includes data indicating insertion loss in every respective wavelengths in an optical multiplexer connected to an output side.

17. An optical output control circuit as claimed in claim 11, wherein said correction data includes data indicating insertion loss in every respective wavelengths in an optical multiplexer connected to an output side.

18. An optical output control circuit as claimed in claim 12, wherein said correction data includes data indicating insertion loss in every respective wavelengths in an optical multiplexer connected to an output side.

19. An optical output control circuit as claimed in claim 13, wherein said data processing means corrects the output level in such a way that said data processing means executes processing of adding the insertion loss in accordance with wavelength of the light signal to be treated to the desired value.

20. An optical output control circuit as claimed in claim 14, wherein said data processing means corrects the output level in such a way that said data processing means executes processing of adding the insertion loss in accordance with wavelength of the light signal to be treated to the desired value.

21. An optical output control circuit as claimed in claim 15, wherein said data processing means corrects the output level in such a way that said data processing means executes processing of adding the insertion loss in accordance with wavelength of the light signal to be treated to the desired value.

22. An optical output control circuit as claimed in claim 16, wherein said data processing means corrects the output level in such a way that said data processing means executes processing of adding the insertion loss in accordance with wavelength of the light signal to be treated to the desired value.

23. An optical output control circuit as claimed in claim 17, wherein said data processing means corrects the output level in such a way that said data processing means executes processing of adding the insertion loss in accordance with wavelength of the light signal to be treated to the desired value.

24. An optical output control circuit as claimed in claim 18, wherein said data processing means corrects the output level in such a way that said data processing means executes processing of adding the insertion loss in accordance with wavelength of the light signal to be treated to the desired value.

25. An optical output control method according to an optical output control circuit comprising the steps of:

varying an input level of a light signal by a level varying means;

monitoring an output level of the light signal by a monitoring means;

controlling variable quantity of said level varying means in accordance with a monitor signal from said monitoring means by a variable quantity control means;

generating a digital signal while digital converting the monitor signal by an A-D conversion means;

storing data in a table to which a data is set, such the data enabling variable quantity corresponding to desired value of the output level of the light signal to be determined from said digital signal; and retrieving said table on the basis of the digital signal outputted from said A-D conversion means, before determining variable quantity in order to harmonize output level of the light signal with the desired value to supply to said variable quantity control means by a data processing means.

* * * * *